US008032877B2

(12) United States Patent
Barnak (10) Patent No.: US 8,032,877 B2
(45) Date of Patent: Oct. 4, 2011

(54) COMPILER NEUTRAL LINKING SOLUTION FOR C++ CODE

(75) Inventor: Branislav Barnak, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1384 days.

(21) Appl. No.: 11/551,629

(22) Filed: Oct. 20, 2006

(65) Prior Publication Data
US 2008/0098377 A1    Apr. 24, 2008

(51) Int. Cl.
*G06F 9/44* (2006.01)
(52) U.S. Cl. ........................ 717/162; 718/165
(58) Field of Classification Search .................. None
See application file for complete search history.

(56) References Cited

U.S. PATENT DOCUMENTS

| 5,920,720 | A | 7/1999 | Toutonghi et al. |
| 5,937,192 | A | 8/1999 | Martin |
| 5,953,527 | A | 9/1999 | Cable |
| 6,163,880 | A | 12/2000 | Ramalingam et al. |
| 6,438,744 | B2 * | 8/2002 | Toutonghi et al. ............ 717/137 |
| 6,968,541 | B1 | 11/2005 | Hanson et al. |
| 2001/0037417 | A1 * | 11/2001 | Meyer .......................... 709/332 |
| 2002/0133478 | A1 | 9/2002 | Dionne et al. |
| 2003/0115571 | A1 | 6/2003 | Phan |
| 2004/0143801 | A1 | 7/2004 | Waters et al. |
| 2005/0028151 | A1 | 2/2005 | Roth et al. |
| 2005/0149914 | A1 | 7/2005 | Krapf et al. |

* cited by examiner

*Primary Examiner* — Emerson C Puente
*Assistant Examiner* — Camquy Truong
(74) *Attorney, Agent, or Firm* — Patents on Demand, P.A.; Brian K. Buchheit; Scott M. Garrett (57) ABSTRACT

The present invention provides a solution where interactions between different C++ modules can be reduced to interactions written in the C programming language. This permits code linking the difference C++ software modules to be written in the C programming language. Because naming conventions for linking symbols are standardized for the C programming language across all compilers, the C++ software modules can be linked to each other in a compiler neutral fashion. This is true even when the linked software modules are complied using different C++ compilers having non-standardized naming conventions for linking symbols. In absence of the disclosed solution, the different C++ compilers would generate code that cannot be linked.

15 Claims, 4 Drawing Sheets

COMPILER NEUTRAL LINKING SOLUTION FOR C++ CODE

BACKGROUND

1. Field of the Invention

The present invention related to the field of C++ programming language technologies and, more particularly, to a compiler neutral linking solution for C++ code.

2. Description of the Related Art

The C++ programming language is a superset of the C programming language that includes extensions for object oriented programming. Similar to the C programming language, the C++ programming language is typically implemented as a compiled language. A C++ compiler translates source code written in the C++ language to object code, which includes machine code and linking information. Multiple compiled modules of object code are linked, using a linker, to create an executable program or a runtime library.

The linking information can include defined or exported linking symbols as well as undefined or imported linking symbols. Exported symbols are functions or variables that are present in the compiled module, which are available to other modules. The imported symbols are functions or variables that are referenced but are not internally defined. The imported symbols are local placeholders that correspond to the exported symbols contained within a different software module. The linker replaces placeholders of undefined symbols (imported symbols) with corresponding defined symbol (exported symbol) addresses, which permits multiple code modules to interact with each other.

In the C programming language, naming conventions for linking symbols are standardized and are the same for every implementation of the C programming language. This is, however, not true for the C++ programming language, where naming conventions for linking symbols are not standardized and can vary from implementation to implementation. Thus, different symbol naming conventions can be used by different C++ compilers. As a result, software modules compiled with different C++ compilers are often unable to be properly linked, which means that it is practically impossible for modules written in C++ and built by different compilers to interoperate. This can be a serious disadvantage or even a show-stopper for many cooperative software projects involving development entities that use different design platforms, each design platform having its own C++ compiler.

SUMMARY OF THE INVENTION

The present invention provides a solution where interactions between different C++ modules can be reduced to interactions written in the C programming language. This permits code linking the different C++ software modules to be written in the C programming language. Because naming conventions for linking symbols are standardized for the C programming language across all compilers, the C++ software modules can be linked to each other in a compiler neutral fashion. This is true even when the linked software modules are compiled using different C++ compilers having non-standardized naming conventions for linking symbols. In absence of the disclosed solution, the different C++ compilers would generate code that cannot be linked.

The present invention can be implemented in accordance with numerous aspects consistent with material presented herein. For example, one aspect of the present invention can include a system for compiler neutral linking of C++ based code. The system can include a first software module, a second software module, and a program. The first software module can include a first main section and a first linkage section. The first software module can be compiled with the first C++ compiler. The second software module can include a second main section and a second linkage section. The first and second main sections can include code written in a C++ programming language. The first and second linkage sections can include code written in a C programming language. The second software module can be compiled using a second C++ compiler, which is different from the first C++ compiler and that uses different naming conventions for linkage symbols as those used by the first C++ compiler.

The program can include machine code of the first software module, which was compiled using the first C++ compiler and machine code of the second software module, which was compiled using the second C++ compiler. The machine code for the software modules can be linked to each other in the program. Additionally, the first main section can include a C++ call for an object implemented in the second main section. Interactions between the first software module and the second software module can be C based interactions established by the first linkage section and the second linkage section. These interactions can convert the C++ call to a C based ball in a manner transparent to the first and second main sections.

Another aspect of the present invention can include a method for linking compiled C++ code. The method can include a step of identifying a first software module and second software module, which are written in a C++ programming language. The first software module can include a C++ call to the second software module. A C based communication layer including C programming language based and C linkage functions can be inserted between the first software module and the second software module. When executing the first software module, the C based communication layer can receive the C++ call from the first software module, can convert the C++ call to a call to a corresponding C linkage function, and can call the C linkage function. The second software module can execute the C linkage function, which triggers an execution of a corresponding C++ method implemented in the second software module, where the executed C++ method corresponds to the C++ call made by the first software module.

Yet another aspect of the present invention can include a method of calling an object method using a C based communication layer, when the object method is written in an object oriented language, such as a C++ computing language. The method can include a step of detecting a first software module and a second software module, each written in the object oriented language. The first software module can call an object method implemented in the second software module. The object oriented language can be an extension of a C programming language. An interface can be created between the first software module and the second software module that converts the call from the first software module formatted as an object oriented language call into a C programming language call. The C programming language call can be made to a C function implemented within the second software module. When the second software module executes the called function, a call to the object method can be generated.

It should be noted that various aspects of the invention can be implemented as a program fro controlling computing equipment to implement the functions described herein, or a program for enabling computing equipment to perform processes corresponding to the steps disclosed herein. This program may be provided by storing he program in a magnetic disk, an optical disk, a semiconductor memory, any other recording medium, or can also be provided as a digitally encoded signal conveyed via a carrier wave.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
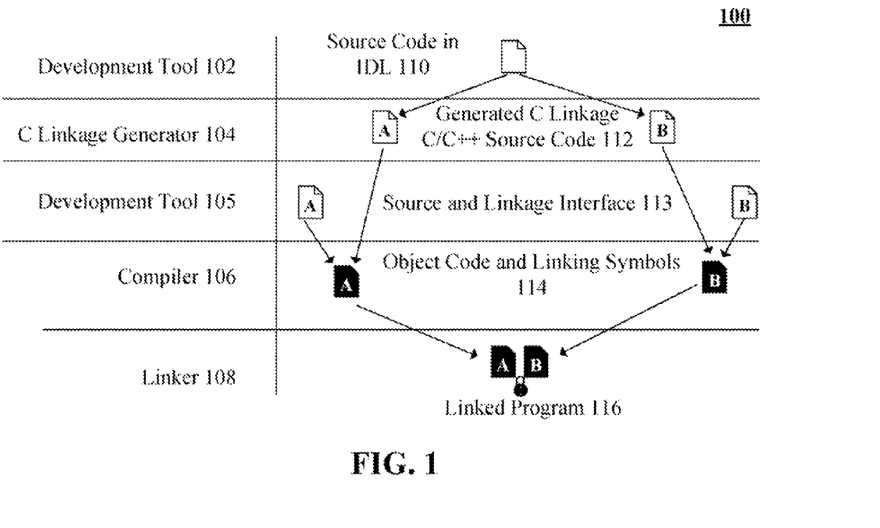
FIG. 1 is a schematic diagram showing a compiler neutral linking solution for C++ code in accordance with an embodiment of the inventive arrangements disclosed herein.

FIG. 1 is a schematic diagram 100 showing a compiler neutral linking solution for C++ code in accordance with an embodiment of the inventive arrangements disclosed herein. The solution disclosed herein can reduce interactions between C++ modules to interactions written in the C programming language.

The solution can, for example, start with a first development tool 102 that can be used to create an interface definition 110 written in an Interface Description Language (IDL). This interface 110 can define the interactions between C++ modules in an abstract way that provides an isolation layer that encapsulates and hides implementation details in each module. A C linkage generator 104 can generate C linkage source code 112, which is code written in C and C++ from the IDL source 110. The C linkage source code 112 can include C linkage functions, stubs, and skeletons that are elaborated upon in detail in FIG. 2 and FIG. 3.

Once the above code 112 is generated, actual implementation of the C++ modules can begin. Development tool 105 can be used to add program logic and interface class implementations, via source code 113 written in C++, to each of the Modules A and B, which are linked by the linkage interface created by C linkage generator 104. For example, development tool 105 can be used to extend skeleton classes and to provide interface implementations. Stubs can also be invoked to execute functionality implemented in classes extending the skeletons.

The C++ source code 113 and linkage interface code 112 can be compiled using one or more C++ compilers 106. The compilers 106 can create object code and linking symbols 114. Linker 108 can link the compiled object code to create linked program 116. Because interface source code 112 reduces C++ call to C based communications, the linking symbols 114 used by linker 108 conform to C programming language standards and not to C++ based standards. Since unlike the C++ programming language, the C programming language uses standardized naming conventions for linking symbols, diagram 100 provides a compiler neutral linking solution for C++ source code.

The software development tools 102 and 105 can each be a program or application configured to permit software developers use to create, edit, debug, or maintain source code. Software development tools 102 and 105 can be implemented as a single tool or as two separate tools. In one embodiment, each of the software development tools 102 and/or 105 can include an integrated development environment. For example, the software development tool 102 and 105 can include a Rational Analysis, Design and Construction (ADC) product from International Business Machines Corporation (IBM), such as IBM Rational Application Developer, IBM Rational Web Developer, IBM Rational Software Architect, IBM Rational Data Architect, WebSphere Business Modeler, Rational Rose, Rational Systems Developer, IBM Rational Rose Technical Developer, and the like. The Rational (ADC) products are provided for illustrative purposes only, and the contemplated implementations for tool 102 or 105 are not to be construed as limited in this regard.

The C linkage generator 104 can be any software tool capable of creating a linkage interface source code 112 as described herein. In one embodiment, the linkage interface 104 can be part of a tool that automates the linkage interface 112 creation and utilization process. This automation can be partial, which may require some developer adjustments to an interface definition associated with the linkage interface 112 or some adjustments to automatically generated C code. The automation can also be fully automated, which can occur without developer intervention in a fashion transparent to a software developer. The C linkage generator 104 can be integrated with development tool 102 and/or 105 or can be implemented separate from either tool.

The compiler 106 can be a computer program capable of translating C++ source code into an equivalent program written in a target output language, which is capable of executive upon a machine. That is, compiler 106 can convert C++ code and C code into object code and linking symbols 114. The compiler 106 need mot adhere to any particular naming conventions to generate linking symbols for C++ based code. Different compilers 106 can be used for compiling source code of Module A and for compiling source code of Module B. Compiler 106 can include, but is not limited to, an IBM C++ based compiler, a GNU C++ based compiler, a GNU CC source based compiler, a BORLAND C++ based compiler, a SUN C++ based compiler, an APPLE C++ based compiler, a MICROSOFT C++ compiler, and the like.

It is important that all modules be compiled for the same platform, regardless of which platform specific compilers 106 are used. That is, different compilers 106 are able to be used in system 100 assuming all modules are run on a single Operating System (OS) platform, on a single computing device, and within one process.

The linker 108 can be a program that takes multiple objects generated by compiler 106 and assembles them into a single executable. For example, linker 108 can create linked program 116 from object code and linking symbols 114, which include objects and symbols for Module A and Module B. The linking symbols can include exported symbols and imported symbols. Exported symbols can be functions or variables defined for a software module that are available for use by other modules. The imported symbols can be functions or variable that are undefined for software modules that are reference by the software object. For example, when Module A calls a function of Module B, Module A can include imported linking symbols and Module B can include exported linking symbols.

It should be appreciated that application logic for each of the software modules of the present invention, including Module A and B as shown, can operate as if no linkage interface were present and as if direct C++ based interactions were occurring between the software modules. Hence, Module A and Module B can interact across a "virtual C++ communication layer" even though actual communications between modules occur via a C based communication layer.

It should be noted that the components shown in diagram 100 need not be implemented exactly as shown, but that other derivatives and alternatives are contemplated. For example, in one contemplated embodiment, the functionality of compiler 106 and linker 108 can be integrated into a single component. In another embodiment, software development tool 102, tool 105, and the C linkage generator 104 can be integrated into a single software development tool. The C linkage generator 104 can also be a component integrated with the compiler 106 and/or the linker 108 in other implementations of the invention.

Figure 2:
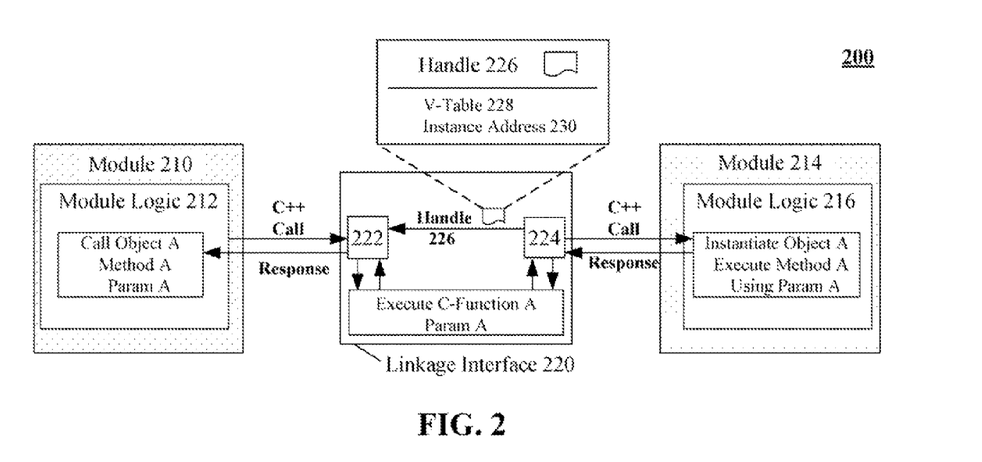
FIG. 2 is a schematic diagram of a system that uses a C based linkage interface for interactions between two software modules containing C++ based code in accordance with an embodiment of the inventive arrangements disclosed herein.

FIG. 2 is a schematic diagram of a system 200 that uses a linkage interface 220 to interact between software modules 210 and 214 in accordance with an embodiment of the inventive arrangements disclosed herein.

In system 200, module 214 can include module logic 216 that implements a C++ class for Object A. Object A can include an accessible Method A, which has a set of arguments referred to as Parameters A. Module 210 can include module logic 212, which calls Method A of Object A. The module logic 212 can be written in C++. Different C++ compilers can be used to compile source code of Module 210 and Module 214.

The linkage interface 220 can be a C based interface that creates a C based communication layer between module 210 and module 214. The linkage interface 220 can convert C++ interactions into equivalent C based interactions. The conversations can be handled in a manner transparent to module logic 212 and module logic 216, which can operate as if C++ based calls are being conveyed between module 210 and module 214. Hence, module 210 and 214 can communicate across a virtual C++ communication layer even though actual communications occur via a C based communication layer established by linkage interface 220.

In one embodiment, C++ formatted messages from module 210 can be converted into equivalent C linkage functions by C++ to C data converter 222. C to C++ data converter 224 can convert to C linkage functions to equivalent C++ formatted messages. Converter 222 can be implemented within module 210 and converter 224 can be implemented within module 214. The C linkage functions can be called by converter 222, which are executed within a software component of module 224.

In order for converter 222 to convert C++ calls from module 210 into equivalent C linkage functions, a mapping from C++ calls to C linkage functions must be known. In one embodiment, mappings can be maintained by module 214 and stores in a C based structure called a V-Table 228. The V-Table 228 can consist of pointers to C linkage functions. A reference to the V-Table 228 can be passed to converter 222.

Additionally, converter 222 must be aware of an address of the implementation class instance that is to be referenced when making a C++ call. This instance address 230 can be conveyed from converter 224 to converter 222. In one embodiment, the V-table 228 and instance address 230 can be grouped into a C based structure called an instance handle 226, which can be conveyed to converter 222.

In one embodiment, each module 210 and 214 can wrap the C linkage functions used by converter 222 or 224 and expose them as C++ methods. This can cause the calling module 210 and the implementation module 214 to see the C++ interfaces and to not see the equivalent C linkage functions.

Figure 3:
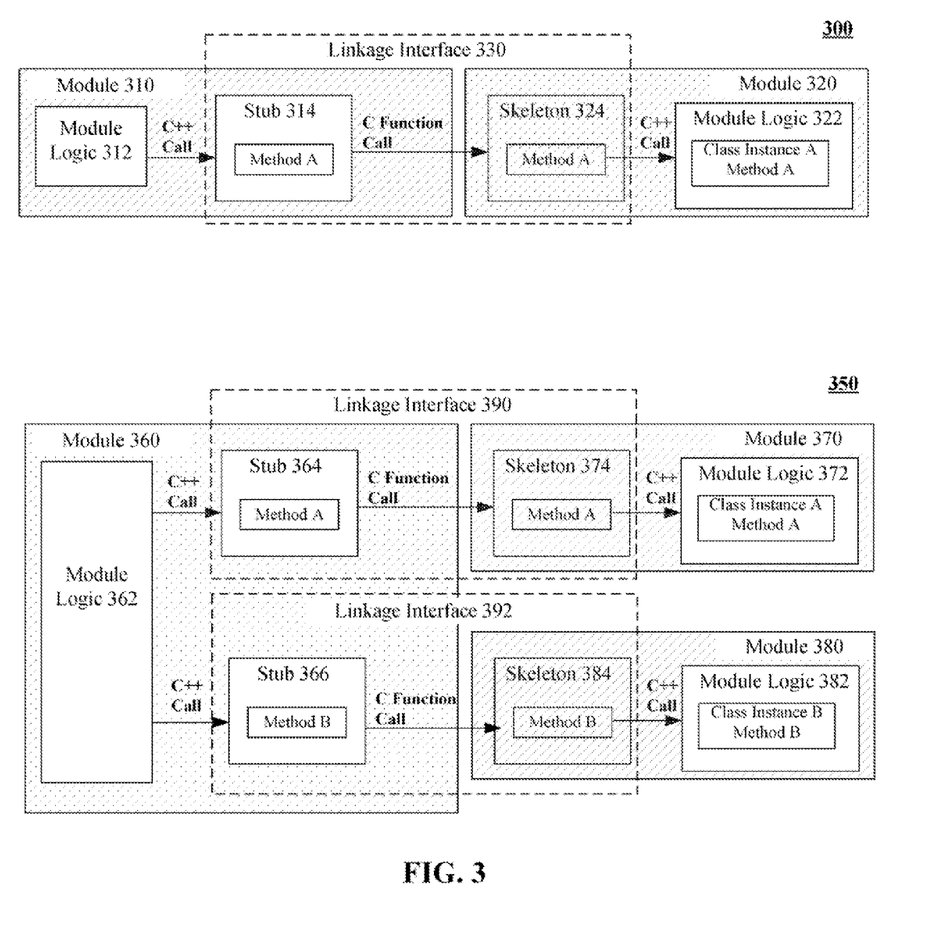
FIG. 3 is a schematic diagram of systems that implement a C based linkage interface using stubs and skeletons in accordance with embodiments of the inventive arrangements disclosed herein.

FIG. 3 is a schematic diagram of a system 30 and system 350 that implements a C based linkage interface using stubs and skeletons in accordance with embodiments of the inventive arrangements disclosed herein. System 300 can represent one specific arrangement for implementing system 200, where the stub 314 includes functionality of C++ to C converter 222 and skeleton 324 includes functionality of C to C++ converter 224. Stub 314, skeleton 324, and linkage interface 330 can be implemented as classes included within an interface class library. The linkage interface 330 can be one implementation of linkage interface 220.

One set of C linkage functions can exist per module. Each module implementing the interface can have its own set of C linkage functions. All implementations of an interface within one module can share the same set of C linkage functions as they all have the interface class as a common denominator. In other words, all implementations of an interface and all instances of those classes can share the same skeleton 324 and the same V-Table as long as they are implemented within one module. Each different instance can have an instance specific address.

In system 300, module 310 can include module logic 312 that calls a C++ class, which is implemented in module 320. The C++ call can be made to stub 314, which is local to module 310. Stub 314 can invoke a C function implemented in module 320, specifically within skeleton 324. The skeleton 324 can make a C++ call to Method A, which is implemented within module logic 322. Interactions between stub 314 and skeleton 324 can occur exclusively through C function calls, thus no C++ linkages are required between module 310 and module 320. Accordingly, module 310 and module 320 can interact regardless of which C++ compilers are used to convert source code of module 310 and source code of module 320 into machine executable code.

System 350 shows that multiple linkage interfaces 390 and 392 can be used by a single software module 360. Each linkage interface 390 and 392 can be associated with an interface specific module 370 and 380. As shown, module logic 362 written in C++ can send C++ calls for Method A of instance Class A, implemented within module 370 and for Method B of instance Class B implemented within module 380. C linkage functions can permit C-based communications to occur between the stubs 364-366 and skeletons 374-384.

In one embodiment, each interface 390 and 392 can utilize an handle as described in FIG. 2, which includes a V-table structure and an instance specific address. The handle can provide stubs 364 and 366 with needed information to invoke appropriate C linkage functions and to access a specific class instance associated with the instance address.

It should be appreciated that it is possible to have different implementations of the same interface reside in separate software modules. Also, any interface can be implemented in any software module and every software module can invoke any interface, even if their implementations reside in the same software module.

Figure 4:
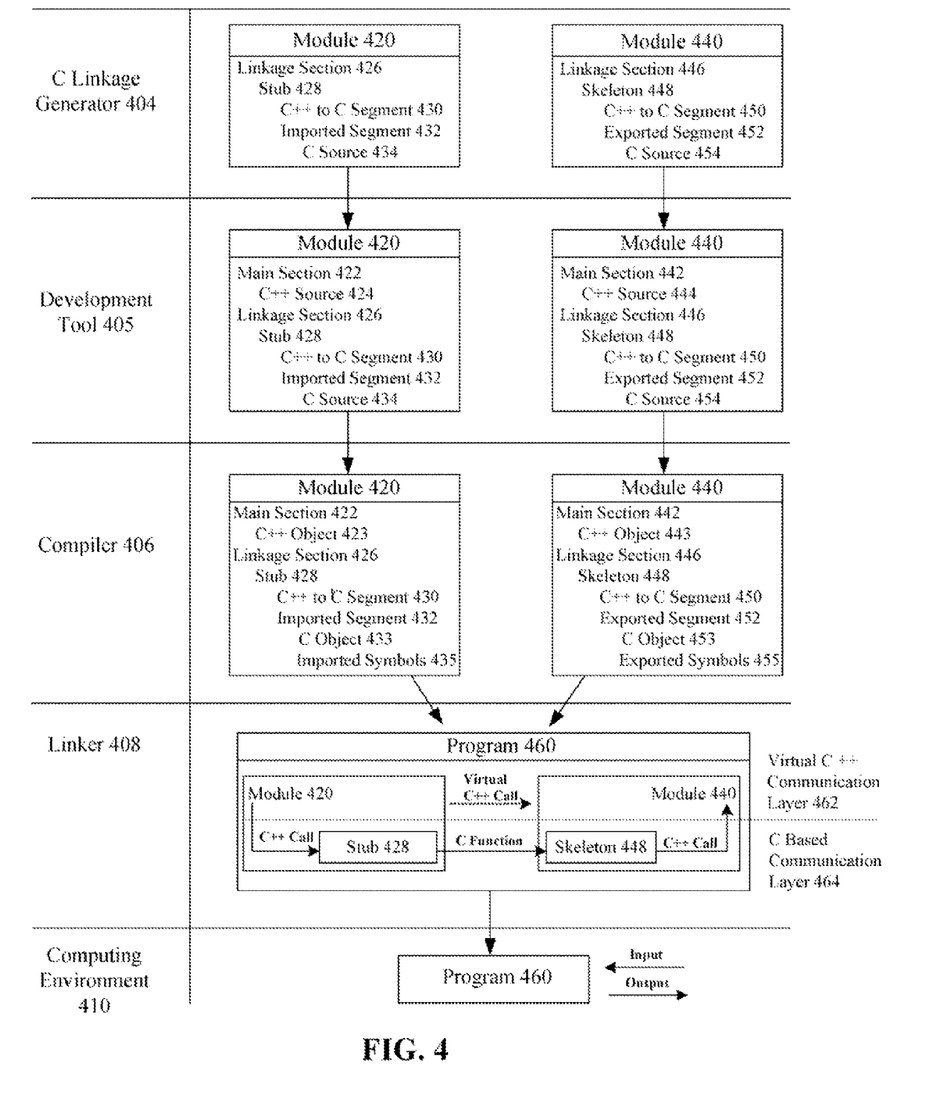
FIG. 4 is a schematic diagram showing a compilation system for C++ based code that lings software modules in a compiler neutral fashion in accordance with an embodiment of the inventive arrangements disclosed herein.

FIG. 4 is a schematic diagram 400 showing a compilation system for C++ based code that links in a compiler neutral fashion in accordance with an embodiment of the inventive arrangements disclosed herein. In diagram 400, two software modules 420 and 440 can be created. The C linkage generator 404 can ensure that interactions between modules 420 and 440 are based exclusively upon C based code. The C based code can be contained in a linkage section (426 and 446) of each module. Each linkage section 426 and 446 can include one or more stubs 428 and/or skeletons 448.

The stub 428 can be a software section that translates C++ calls to equivalent C based interactions. C based interactions can use C linkage functions to communicate across software module boundaries. There can be a one-to-one correspondence between C linkage functions and called C++ object methods. An instance address can be passed to the stub 428, as shown in system 200, to ensure the stub can reference a proper instance.

More specifically, stub 428 can include conversion segment 430 and an import segment 432. The conversion segment can be a C++ to C conversion segment 430 configured to perform the C++ to C language conversions. Hence, segment 430 an map called C++ object methods to corresponding C linkage functions. In one embodiment, the mappings can be determined by a V-table structure obtained from module 440, as described in system 200.

Skeleton 448 can include code segment 450 that generates a C++ call from an equivalent C linkage function. The exported segment 452 of skeleton 448 can include C linkage functions, which are remotely callable. The C linkage functions can be written in C based source code 454.

A development tool 405, which can be any tool capable of creating software source code, can be used to add main section 422 an section 442 to modules 420 and 440. Each main section 422 and 442 can include C++ based source code 424 and 444.

After the linkage sections 426 and 446 and main sections 422 and 442 have been added to the modules 420 and 440, one or more compilers 406 can compile the source code, to generate object code and linkage symbols. C++ source code 424 and 444 can be used to generate C++ object code 423 and 443. C source code 424 and 444 can be used to generate C object code 433 and 453. Since all interactions between module 420 and 440 occur through C based code, no linkage symbols are generated from C++ source 424 or 444. Linkage symbols 435 and 455 are generated from C source code 434 and 454. Because C linkage symbols have standardized naming conventions, linkage symbols 435 and 455 should be compatible regardless of the compiler 406 used for each of the software modules. The stub 428, which performs a call to code implemented in module 440, includes imported linkage symbols 435. The skeleton 448 includes corresponding exported linkage symbols 455.

The linker 408 can generate a program 460 from module 420 and module 440. In doing so, the linker 408 replaces placeholders included in the imported symbols 435 with corresponding addresses for invoking machine code of module 440. As shown, the C++ portion of module 420 conveys virtual C++ calls to module 440 over a virtual C++ communication layer 462. This layer is virtual, since actual communications are conducted through C based communication layer 464. That is, C++ calls from module 420 are sent to stub 428, which calls a C linkage function of skeleton 448. Skeleton 448 converts the C linkage function to a C++ call, which is sent to a C++ portion of module 440.

It should be noted that the calling program and the called program (module 420 and 440 respectively) and even the software developer of modules 420 and/or 440 can be unaware that actual communications for linked program 460 occur via the C based communication layer 464.

Additionally, it should be appreciated that the C language does not have a built-in support for exception handling. Since all of the method calls go through C linkage functions an exception propagation solution is needed. One such solution is to catch exceptions on the server side before the C linkage function is returned, to persist the exception information, and to pass it over to the client side. In the stub class on the client side, this information is used to re-throw the exception as a new object compatible with the client-side C++ language implementation. One consequence of this is that all exceptions propagated must be subclasses of a predefined set of exception classes. That is, they need to be known to the C linkage layer.

Figure 5:
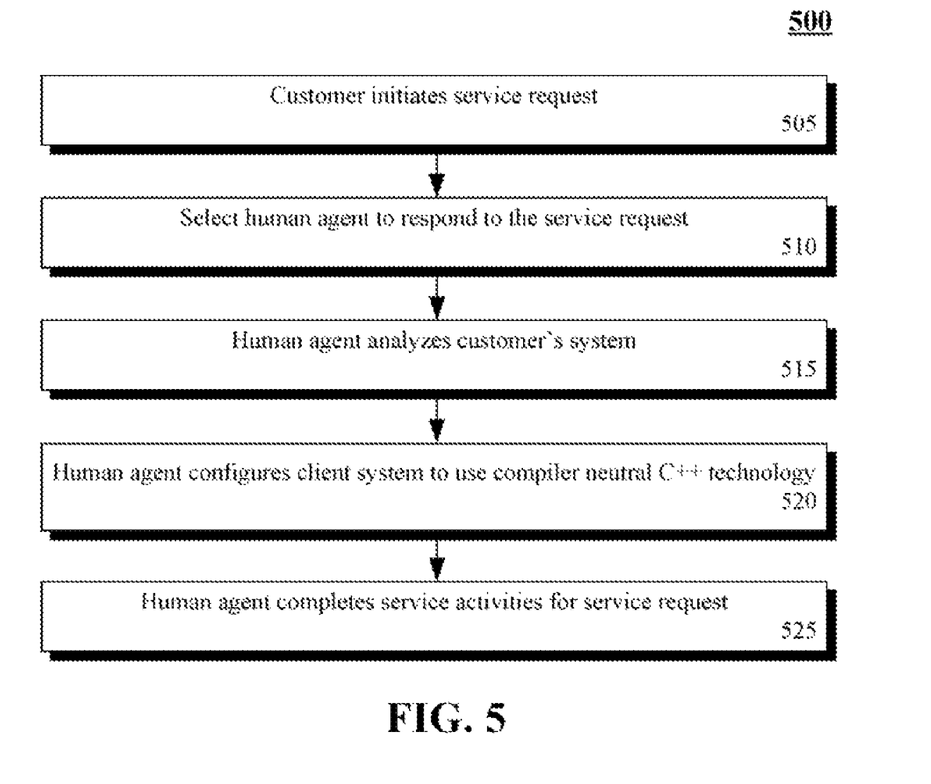
FIG. 5 is a flow chart of a method where a service agent can configure a system that permits compiler neutral linking of C++ code in accordance with an embodiment of the inventive arrangements disclosed herein.

FIG. 5 is a flow chart of a method 500 where a service agent can configure a system that permits compiler neutral linking of C++ code in accordance with an embodiment of the inventive arrangements disclosed herein. Method 500 can be preformed in the context of system 100.

Method 500 can begin in step 505, when a customer initiates a service request. The service request can be a request for a service agent to modify a development environment to permit compiler neutral linking of C++ code. The service request can also be a request to troubleshoot an existing system, to train personnel to use or administer the new compiler neutral system, and the like. In step 510, a human agent can be selected to respond to the service request. In step 515, the human agent can analyze a customer's current system and information needs and can develop a solution. In step 520, the agent can implement the solution. For example, the human agent can install and configure a software development tool that includes a C linkage generator that automatically creates a C based communication layer that is used for software module interactions, which would otherwise be based upon C++ code. In step 525, the human agent can complete service activities for the service request.

It should be noted that while the human agent may physically travel to a location local to adjust the customer's computer or application server, physical travel may be unnecessary. For example, the human agent can use a remote software agent to remotely manipulate the customer's computer system and/or to remotely conduct training sessions.

The present invention may be realized in hardware, software, or a combination of hardware and software. Any king of computer system or other apparatus adapted carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the feature enabling the implementation of the methods described herein, and which when loaded in a computer system is able to carry out these methods. Computer program in the present context means any expression, in any language, code or notation, of a set of instruction intended to cause a system having an information processing capability to perform a particular function either directly or after either or both of the following: a) conversion to another language, code or notation; b) reproduction in a different material form.

What is claimed is:

1. A system for compiler neutral linking of C++ based code comprising:
   a memory;
   a first software module stores in the memory comprising a first main section and a first linkage section, said first main section including code written in a C++ programming language and said first linkage section including code written in a C programming language, wherein said first software module is compiled with a first C++ compiler;

a second software module comprising a second main section and a second linkage section, said main section including code written in a C++ programming language and said second linkage section including code written in a C programming language, wherein said second software module is compiled with a second C++ compiler, which is different from said first C++ compiler and that uses different naming conventions for linkage symbols as those used by the first C++ compiler; and a program comprising machine code of the first software module, which was compiled using said first C++ compiler and machine code of the second software module, which was compiled using said second C++ compiler, wherein the first main section includes a C++ call for an object implemented in the second main section, and wherein interactions between the first software module and the second software module are C based interactions established by the first linkage section and the second linkage section, said C based interactions including an interaction associated with the C++ call that operates in a manner transparent to the first main section and the second main section, wherein the first linkage section converts the C++ call to a corresponding call, which is a C linkage function wherein said C linkage function is implemented within the second linkage section, wherein the first linkage section includes a software component that receives an address for an instance of the object associated with the C++ call and that receives a mapping for said C linkage function that correspond to object implemented by the second software module, wherein the mapping and the address are used by the software component to determine the C linkage function that corresponds to the C++ call.

2. The system of claim 1, wherein the software component is a software stub.

3. The system of claim 2, further comprising:
a linkage interface class defined in an Interface Description Language, said linkage interface class defining a template for the stub and a template for a skeleton, wherein the first linkage section is included within an instance of the stub, and wherein the second linkage section is included within an instance of the skeleton.

4. A method for compiler neutral linking of C++ based code comprising:
compiling a first software module with a first C++ compiler, wherein the first software module comprises a first main section and a first linkage section, said first main section including code written in a C++ programming language and said first linkage section including code written in a C programming language;
compiling a second software module with a second C++ compiler, wherein the second software module comprises a second main section and a second linkage section, said main section including code written in a C++ programming language and said linkage section including code written in a C programming language, wherein the second C++ compiler is different from the first C++ compiler, and wherein the second C++ compiler uses different naming conventions for linkage symbols compared to those used by the first C++ compiler;
creating a program comprising:
machine code of the first software module, which was compiled using said first C++ compiler; and
machine code of the second software module, which was compiled using the second C++ compiler, wherein the first main section includes a C++ call for an object implemented in the second main section, and
wherein interactions between the first software module and the second software module are C based interactions established by the first linkage section and the second linkage section, said C based interactions including an interaction associated with the C++ call that operates in a manner transparent to the first main section and the second main section, wherein the first linkage section converts the C++ call to a corresponding call, which is a C linkage function wherein said C linkage function is implemented within the second linkage section, wherein the first linkage section includes a software component that receives an address for an instance of the object associated with the C++ call and also receives a mapping for said C linkage function that correspond to object implemented by the second software module, wherein the mapping and the address are used by the software component to determine the C linkage function that corresponds to the C++ call.

5. The method of claim 4, wherein said C linkage function is implemented within the second linkage section.

6. The method of claim 4, wherein the software component is a software stub.

7. The method of claim 6, further comprising:
defining a linkage interface class in an Interface Description Language, wherein the linkage interface class defines a template for the stub and a template for a skeleton, wherein the first linkage section is included within an instance of the stub, and wherein the second linkage section is included within an instance of the skeleton.

8. The method of claim 4, further comprising:
creating a V-table that maps object methods implemented in the second software module to C linkage functions; and
conveying a reference to the V-table to the stub, wherein the software component utilizes mappings of the V-table to convert the received C++ call to the corresponding C linkage function.

9. The method of claim 4, wherein said steps of claim 4 are steps performed by at least one machine in accordance with at least one computer program stored within a machine readable memory, said computer program having a plurality of code sections that are executable by the at least one machine.

10. The method of claim 4, wherein the steps of claim 4 are performed by at least one of a service agent and a computing device manipulated by the service agent, the steps being performed in response to a service request.

11. A computer program product comprising a non-transitory computer useable storage medium having computer usable program embodied therewith, wherein the computer usable program code when executed on a computing device comprising hardware and software causes the computing device to:
compile, at the computing device comprising hardware and software, a first software module with a first C++ compiler, wherein the first software module comprises a first main section and a first linkage section, said first main section including code written in a C++ programming language and said first linkage section including code written in a C programming language;
compile, at the computing device comprising hardware and software, a second software module with a second C++ compiler, wherein the second software module comprises a second main section and a second linkage section, said main section including code written in a C++ programming language and said linkage section including code written in a C programming language, wherein the second C++ compiler is different from the first C++ compiler, and wherein the second C++ compiler uses different naming conventions for linkage symbols compared to those used by the first C++ compiler;

create, at the computing device comprising hardware and software, a program comprising:

machine code of the first software module, which was compiled using said first C++ compiler; and     machine code of the second software module, which was compiled using the second C++ compiler, wherein the first main section includes a C++ call for an object implemented in the second main section, and wherein interactions between the first software module and the second software module are C based interactions established by the first linkage section and the second linkage section, said C based interactions including an interaction associated with the C++ call that operates in a manner transparent to the first main section and the second main section, wherein the first linkage section converts the C++ call to a corresponding call, which is a C linkage function wherein said C linkage function is implemented within the second linkage section, wherein the first linkage section includes a software component that receives an address for an instance of the object associated with the C++ call and also receives a mapping for said C linkage function that correspond to object implemented by the second software module, wherein the mapping and the address are used by the software component to determine the C linkage function that corresponds to the C++ call.

12. The computer program product of claim 11, wherein said C linkage function is implemented within the second linkage section.

13. The computer program product of claim 11, wherein the software component is a software stub.

14. The computer program product of claim 13, wherein the computer usable program code when executed on a computing device comprising hardware and software causes the computing device to:

define a linkage interface class in an Interface Description Language, wherein the linkage interface class defines a template for the stub and a template for a skeleton, wherein the first linkage section is included within an instance of the stub, and wherein the second linkage section is included within an instance of the skeleton.

15. The computer program product of claim 11, wherein the computer usable program code when executed on a computing device comprising hardware and software causes the computing device to:

create a V-table that maps object methods implemented in the second software module to C linkage functions; and     convey a reference to the V-table to the stub, wherein the software component utilizes mappings of the V-table to convert the received C++ call to the corresponding C linkage function.

\* \* \* \* \*